United States Patent [19]

Sauer

[11] 3,985,265
[45] Oct. 12, 1976

[54] DESTACKING ASSEMBLY
[75] Inventor: Donald G. Sauer, Harwinton, Conn.
[73] Assignee: National Can Corporation, Chicago, Ill.
[22] Filed: June 2, 1975
[21] Appl. No.: 582,684

Related U.S. Application Data
[63] Continuation-in-part of Ser. No. 492,783, July 29, 1974.

[52] U.S. Cl. .............................................. 221/221
[51] Int. Cl.² ........................................ B65G 59/06
[58] Field of Search ........... 221/221, 223, 297, 271, 221/220, 290, 293, 297, 251, 93, 256

[56] References Cited
UNITED STATES PATENTS
3,659,744  5/1972  Byrd .................................. 221/221

Primary Examiner—Stanley H. Tollberg
Attorney, Agent, or Firm—Marn & Jangarathis

[57] ABSTRACT

There is disclosed a liner feeder assembly comprised of a liner supply assembly and a transfer assembly including a liner block having at least one cavity for receiving a preformed liner. The liner transfer assembly is provided with a pump and valve assembly in fluid communication with each such cavity for placing such cavity alternately in fluid communications with the suction side or the compression side of the pump for assisting in the removal of a liner from the liner supply assembly containing a supply of nestable liners and the subsequent positioning in such cavity, and for the placing of the liner on a core rod or pin.

5 Claims, 6 Drawing Figures

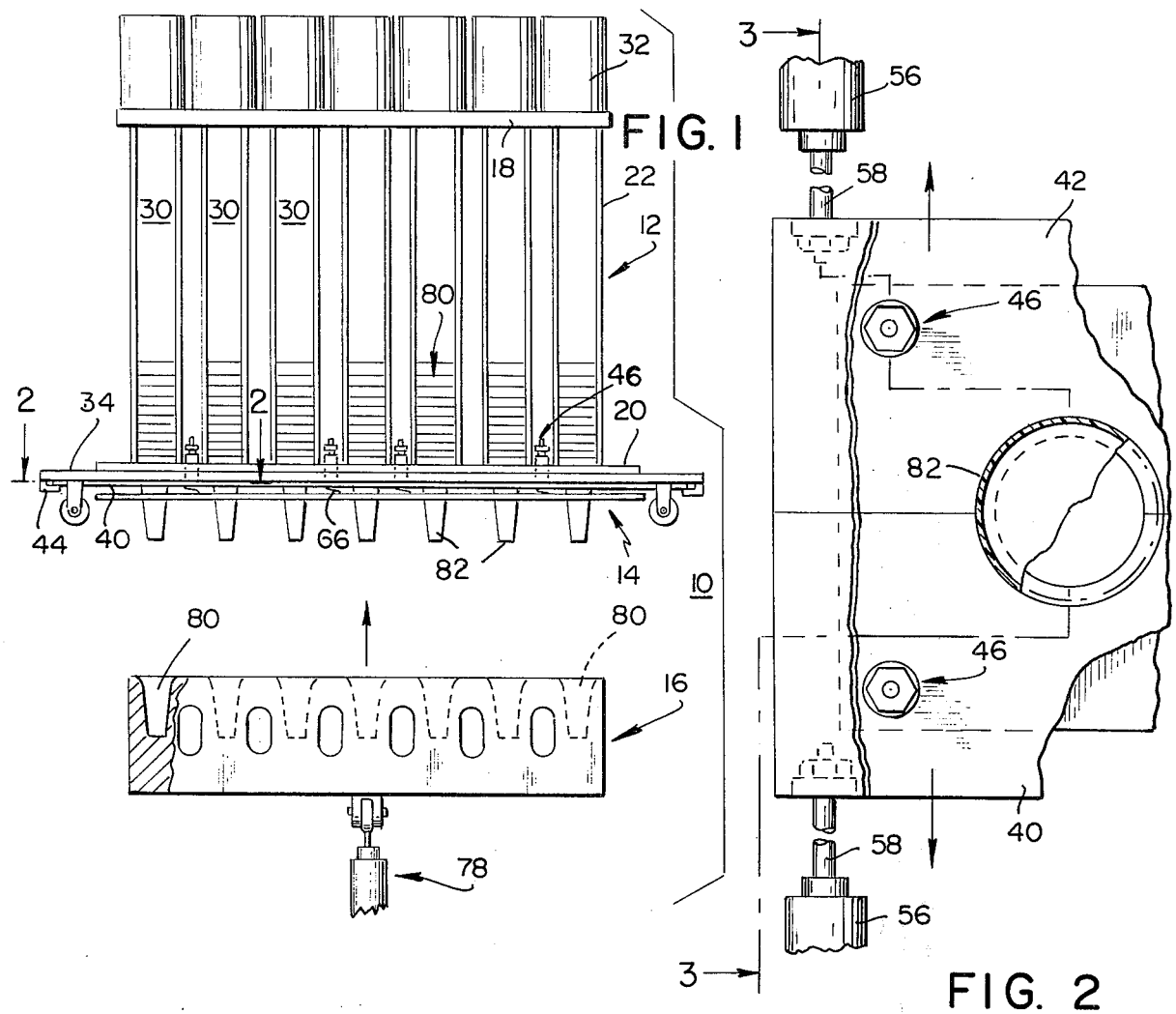
FIG. 1
FIG. 2
FIG. 3
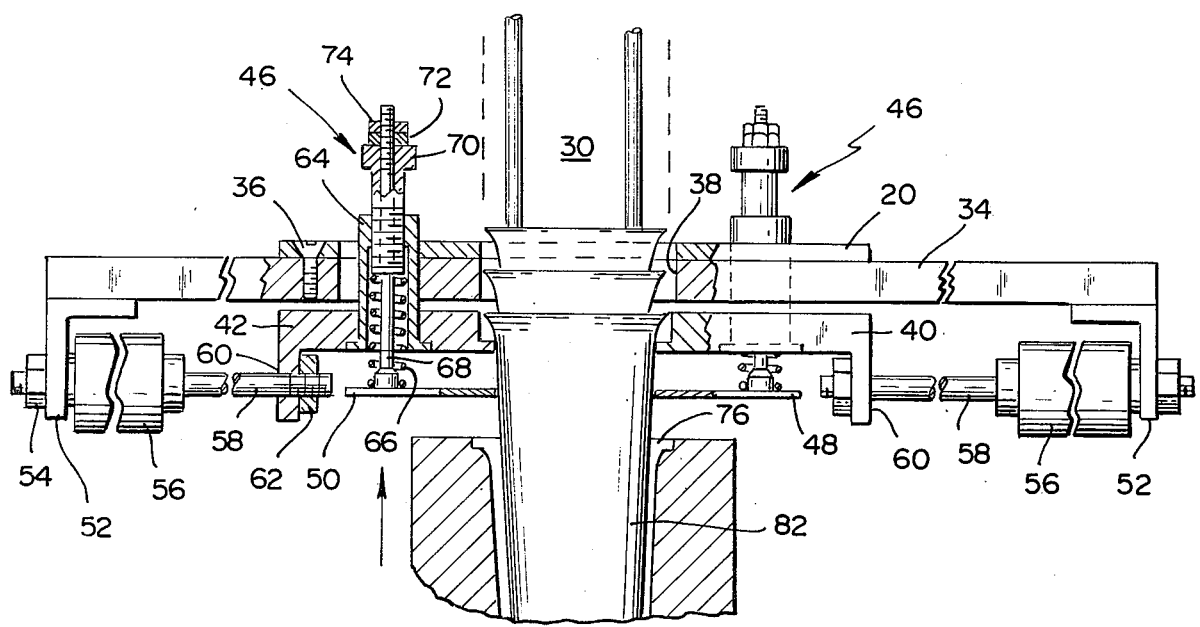

3,985,265

DESTACKING ASSEMBLY

This invention is a continuation-in-part of copending U.S. application Ser. No. 492,783, filed July 29, 1974.

FIELD OF THE INVENTION

This invention relates to an apparatus for selectively removing a hollow article from a stack of such hollow articles, and more particularly to a liner feeder apparatus for the selective removal of a hollow article from a stack thereof for use with an injection blow molding machine in the manufacture of hollow plastic articles and/or containers.

BACKGROUND OF THE INVENTION

Various methods of molding hollow plastic articles and/or containers are well known in the prior art. Plastic containers have found substantial increasing applications; however, despite their weight and toughness, their use is restricted by the cost and characteristic of the plastic composition, particularly for storage of products which will deteriorate or be contaminated, inter alia, by water, carbon dioxide, oxygen and the like.

Recently a process has been advanced which produces a barrier container, i.e., a semi-rigid plastic container provided with a liner or inner layer of another material having properties different than the other layer thereof. In accordance with such process, a preformed liner or sleeve (manufactured, for example, by thermoforming techniques) is positioned over a core rod with a parison being subsequently formed about the liner in an injection station of an injection blow molding machine. The line parison is thereafter expanded in a blow molding station of the machine with the resulting lined container being removed from the core rod in a product receiving station.

In the aforementioned copending application there is disclosed a liner feeder assembly comprised of a liner supply assembly and the transfer assembly including a liner block having at least one cavity for receiving a preformed liner. The liner transfer assembly is provided with a pump and valve assembly in fluid communication with each such cavity for alternately placing such cavity in fluid communications with the suction side or the compression side of the pump for removing a liner from the liner supply assembly containing a supply of nestable liners and for the subsequent placing of the liner on a core rod or pin. At high speed operation, it is necessary to ensure for the positive removal successively of a single liner from a stack thereof to permit continuous operation over extended periods of time.

OBJECTS OF THE INVENTION

It is an object of the present invention to provide a novel de-stacker assembly to ensure the sequential removal of a single hollow article from a stack thereof.

Another object of the present invention is to provide a novel assembly for selectively removing a preformed liner from a stack thereof.

Still another object of the present invention is to provide a novel assembly for assuring the positive removal of a preformed liner from a liner supply station containing a supply of nestable liners.

Various other objects and advantages of the invention will become clear from the following detailed description of an exemplary embodiment thereof and the novel features will be particularly pointed out in connection with the appended claims.

SUMMARY OF THE INVENTION

In accordance with the present invention there is disclosed a de-stacking assembly comprised of a storage assembly for receiving a plurality of nestable hollow articles having an outwardly extending upper lip portion, a support assembly disposed beneath such storage assembly, and a transfer assembly including a cavity to receive a hollow article. In a static condition, the plurality of nestable hollow articles is retained by the support assembly comprised of reciprocally mounted stack retainer and spring loaded separator plates. In operation, upon positioning of the transfer assembly beneath the storage assembly, the plates are caused to move outwardly from the stack of hollow articles to permit the stack to fall to a position where the stack is temporarily supported by the transfer assembly. The plates are then caused to be returned to a static position with the stack retainer plate thereby engaging the outwardly extending lip portion of the next succeeding hollow article. As the transfer assembly is withdrawn, the separator plates positively positions the article within the transfer assembly, with the operative steps being completed, such as disclosed in the hereinabove mentioned co-pending application.

BRIEF DESCRIPTION OF THE DRAWINGS

The invention will be more clearly understood by reference to the following detailed description of an exemplary embodiment thereof in conjunction with the accompanying drawings in which:

FIG. 1 is a front elevational view of the de-stacked assembly of the present invention;

FIG. 2 is an enlarged partial top elevational view of the support assembly of the de-stacking assembly taken along the lines 2—2 of FIG. 1;

FIG. 3 is a side elevational view, partially in section, taken along the lines 3—3 of FIG. 2.

DETAILED DESCRIPTION OF THE INVENTION

Figure 4:
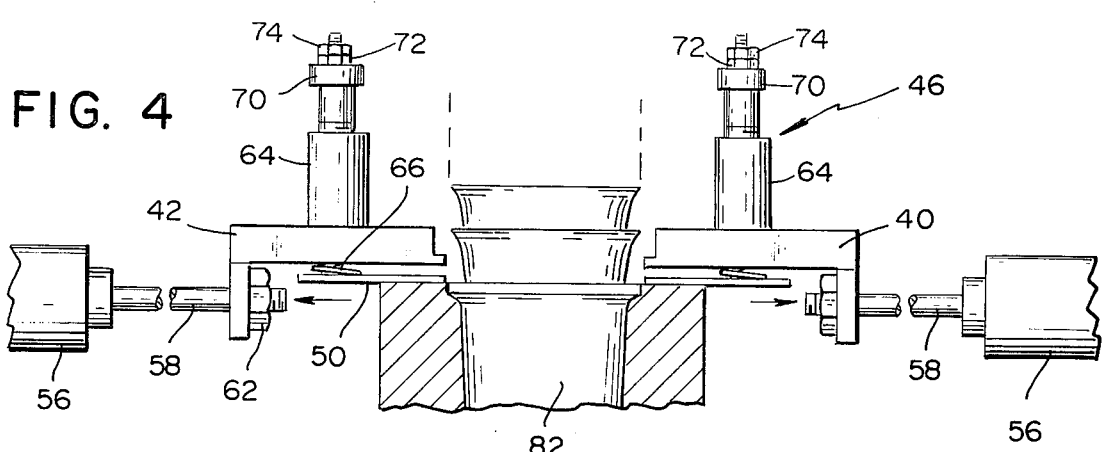
FIGS. 4 to 6 are side elevational views similar to FIG. 3 illustrating the operation of the de-stacking assembly of the present invention.

For a general understanding of the environment to which the present invention may be utilized, reference is made to the aforementioned co-pending application wherein operation is related to a four stage rotary injection blow molding machine.

The de-stacking assembly, generally indicated as 10, referring to FIGS. 1 and 3, is comprised of a supply assembly, a support assembly and a transfer assembly, generally indicated as 12, 14 and 16, respectively. The supply assembly 12 is comprised of upper and lower plates 18 and 20 spacially disposed from each other by a plurality of rods 22. The plates 18 and 20 are formed with a plurality of orifices 28 which are larger than the hollow articles to be positioned therein. The orifices 28 in the lower plate 20 are disposed in co-axial alignment with orifices 28 in the upper plate 18 with four rods 22 being evenly positioned about each orifice 28 in the corresponding plates 18 and 20 to form stack retainer chutes, generally indicated as 30. Mounted to the upper plate 18 in co-axial alignment with the orifices 28 formed therein, there are provided a plurality of cylindrically shaped guide members 32 for facilitating the loading of stacked hollow articles into the retainer chutes 30. The lower plate 20 of the supply assembly is mounted to a horizontally-disposed support plate 34, such as by screws 36 of a feeder assembly (not shown). The support plate 34 is formed with orifices 38 of a diameter larger than the hollow articles to be handled with such orifices 38 being in co-axial alignment with the orifices 28 in the lower plate 20 of the supply assembly 12.

The support assembly 14, referring to FIGS. 1 to 3, is comprised of two horizontally disposed stack retainer plates 40 and 42 positioned beneath the support plate 34 and guidingly mounted for horizontal movement to the support plate 34 by L-shaped end members 44. Beneath the support plates 40 and 42 and mounted thereto by positioning assemblies, generally indicated as 46, there are disposed separator plates 48 and 50, respectively. The transverse end portions (See FIG. 3) of the support plate 34 are provided with downwardly extending lugs 52 in which are mounted, such as by nuts 54, fluid cylinder 56 including rods 58 which are mounted within downwardly extending ear portions 60 by bolts 62, formed on the retainer plates, such as by bolts 62.

The positioning assemblies are comprised of a cylindrically-shaped spring retainer 64 mounted to a stack retainer plate 42; a spring 66 disposed within the positioning assembly about a threaded rod 68 mounted to a respective lower separator plate, e.g. 50; a knurled tensioning adjustment member 70 threadably engaging the upper portion of rod 68; a separator plate spacing adjustment nut 72, and a locking nut 74.

In operation, at the completion of indexing of a platen of an injection blow molding machine (not shown) into a fixed position, the transfer assembly 16 of the liner feed assembly is disposed with cavities 76 therein in co-axial alignment with the chutes 30. The liner transfer assembly 16 is extended vertically upward by a fluid cylinder assembly generally indicated as 78, into contact against the spring-loaded separator plates 48 and 50. Upon the transfer assembly reaching an extended position the fluid cylinders 56 are actuated causing the retainer and separator plates 40, 42, 48 and 50 to move outwardly, as shown in FIG. 4, allowing liner stacks, generally indicated as 80, to fall by gravity into liner cavity 76 of the transfer assembly 16. The liner cavity 76 of the transfer assembly 16 at such time is placed in fluid communication with the suction side of the pump (not shown) to provide a means for seating the lower liner 82 in the cavity 76 as well as to provide a warning should no liner be deposited therein, by an appropriate control means (not shown) as is known to those skilled in the art.

Figure 5:
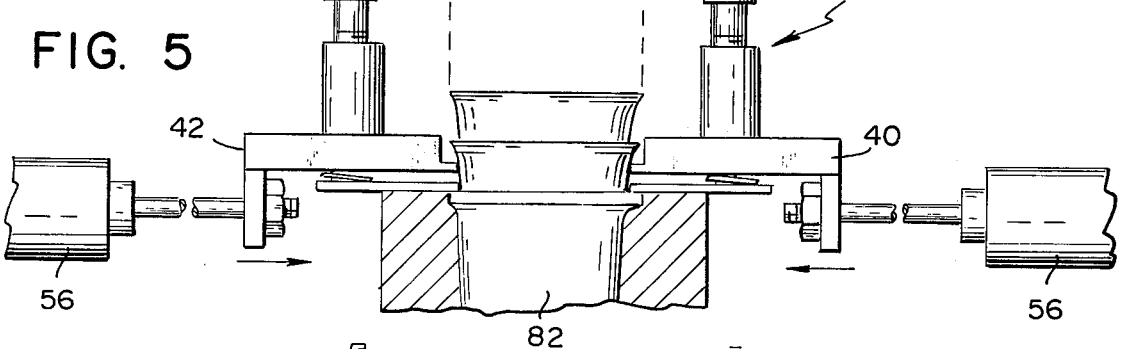
Figure 6:
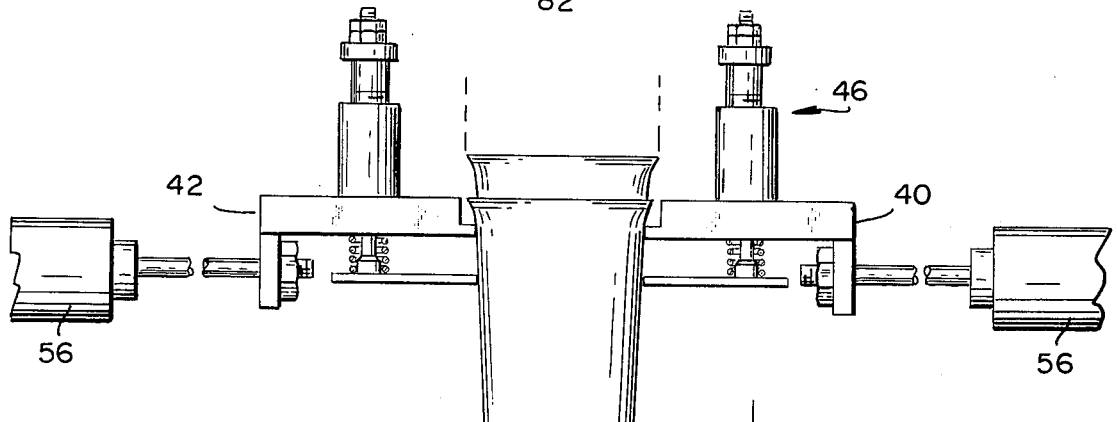
Figure 6:
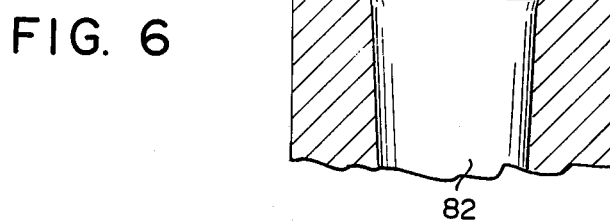

The pneumatic cylinders 56 thereafter cause the stack retainer and separator plates to return to an initial position with the stack retainer plates 40 and 42 engaging a subsequent liner and thus the stack, as shown in FIG. 5, to prevent a plurality of liners from leaving a chute 30. The lower surface of the separator plates 48 and 50 are simultaneously caused to engage the top portion of the liner 82 disposed within the orifice 76 of the transfer assembly 16 to further ensure for the positive placement of the liner 82 therein. The liner transfer assembly 16 is retracted vertically downwardly as shown in FIG. 6 and completes the transfer cycle, as described in the hereinabove mentioned copending application.

The present invention has been described with reference to the removal of a liner from a stack thereof in connection with the formation of a barrier container; however, it will be understood that the concept of the present invention is applicable to the selective removal of an item from a stack thereof, eg., liquid vending machines and the like.

While the invention has been described in connection with an exemplary embodiment thereof, it will be understood that many modifications will be apparent to those of ordinary skill in the art and that this application is intended to cover any adaptations or variations thereof. Therefore, it is manifestly intended that this invention be only limited by the claims and the equivalents thereof.

What is claimed is:

1. An apparatus for selectively removing an article from a stack of such articles which comprises:
   a. a supply assembly means for storing a stack of such articles;
   b. a support plate means for retaining said stack in said supply means, said support plate means including an upper and lower plate means for engaging the upper portion of an article, said lower plate means being spring loaded with respect to said upper plate means and contacts said lowest article upon withdrawal of said dispensing means to ensure removal of said lowest article from said stack;
   c. a dispensing assembly;
   d. drive means for moving said dispensing assembly to a position beneath said supply assembly means and for removing said dispensing assembly after the withdrawal of the lowest article from said stack thereof; and
   e. motive means for moving said support plate means out of contact with said stack whereby said stack is caused to move to a position at which said stack is temporarily supported by said dispensing assembly and for subsequently returning said support plate means to a position whereat said support plate means contacts the article above said lowest article on said stack to retain thereby the remaining articles of said stack in said supply assembly means.

2. The apparatus as defined in claim 1 wherein said dispensing assembly includes a cavity to receive said lowest article.

3. The apparatus as defined in claim 2 wherein said stack of articles is nested.

4. The apparatus as defined in claim 1 wherein said drive means are fluid cylinders.

5. The apparatus as defined in claim 1 wherein said supply assembly means stores a plurality of stacks of said article.

* * * * *

UNITED STATES PATENT AND TRADEMARK OFFICE
CERTIFICATE OF CORRECTION

PATENT NO. : 3,985,265
DATED : October 12, 1976
INVENTOR(S) : Donald G. Sauer

It is certified that error appears in the above-identified patent and that said Letters Patent are hereby corrected as shown below:

In the drawings, sheet 1, Figure 1, the reference numerals 80, as applied to the cavities of the transfer assembly 16 should be 76; and reference numeral 28 should be applied to orifices in the upper plate 18.

Sheet 1, Figure 3 references numeral 28 should be applied to orifices in the lower plate 20.

Sheet 2, Figures 4, 5 and 6 should be deleted and should appear as per attached Figures 4, 5 and 6.

In the abstract, lines 5 to 12, cancel that portion of the sentence beginning with "pump" and continuing to the end of the sentence, and substituting therefor -- de-stacking apparatus to ensure the positive removal of successively individual liners from a supply stack of nested liners in connection with a feeding operation in which liners are loaded into a blow molding machine.-- column 1, line 1 and 2 delete reference to continuation-in-part; line 39, delete, "the aforementioned copending application and substitute therefore --U.S. Patent No. 3,999,915--.

Column 2, line 28, delete "copending application" and substitute therefor --U.S. Patent.--; line 49 delete "copending application" and substitute therefor --U.S. Patent--.

Column 3, line 23, delete "by bolts 62"; and after retainer" insert --support--; line 24, delete "bolts" and substitute therefor--nuts--; line 31, delete "rod 68 " and substitute therefor --spring retainer 64--; line 32, after "nut 74." insert --Positioning assemblies 46 are also provided for supporting separator plate 48 from the retainer support plate 42.--

Claim 1, line 11, delete "means" and substitute therefor --assembly--.

Claim 1, lines 5 to 13, "a dispensing assembly;" included in the claim as item designated "b." and precede the item

UNITED STATES PATENT AND TRADEMARK OFFICE
CERTIFICATE OF CORRECTION

PATENT NO. : 3,985,265
DATED : October 12, 1976
INVENTOR(S) : Donald G. Sauer

It is certified that error appears in the above—identified patent and that said Letters Patent are hereby corrected as shown below:

"a support plate means for..." which should be designated "C".
   Claim 4, line 2, delete "are" and substitute therefor --is a--, and delete "cylinders" and substitute therefor --cylinder assembly.--.

Signed and Sealed this

Twentieth Day of May 1980

[SEAL]

Attest:

SIDNEY A. DIAMOND

Attesting Officer

Commissioner of Patents and Trademarks

UNITED STATES PATENT AND TRADEMARK OFFICE
CERTIFICATE OF CORRECTION

PATENT NO. : 3,985,265

DATED : October 12, 1976

INVENTOR(S) : Donald G. Sauer

It is certified that error appears in the above—identified patent and that said Letters Patent is hereby corrected as shown below:

On the title page, item [63] should be deleted in its entirety.

Signed and Sealed this

Nineteenth Day of May 1981

[SEAL]

Attest:

RENE D. TEGTMEYER

Attesting Officer     Acting Commissioner of Patents and Trademarks